Dec. 8, 1936. E. T. PARSONS 2,063,750
DOUGH WORKING MACHINE
Filed Feb. 11, 1936 3 Sheets-Sheet 1

INVENTOR
Edward T. Parsons
BY
Harry B. Cook,
ATTORNEY

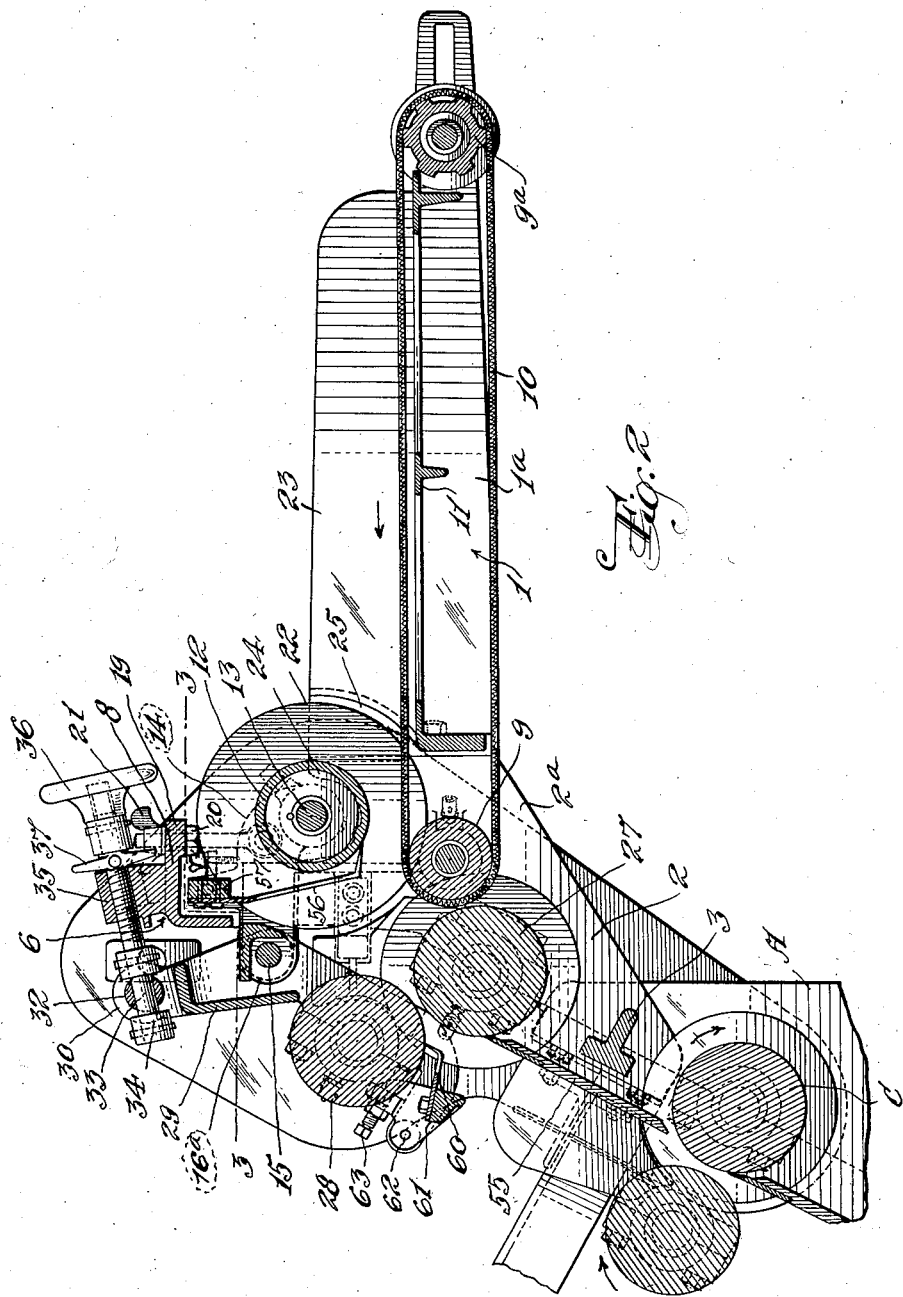

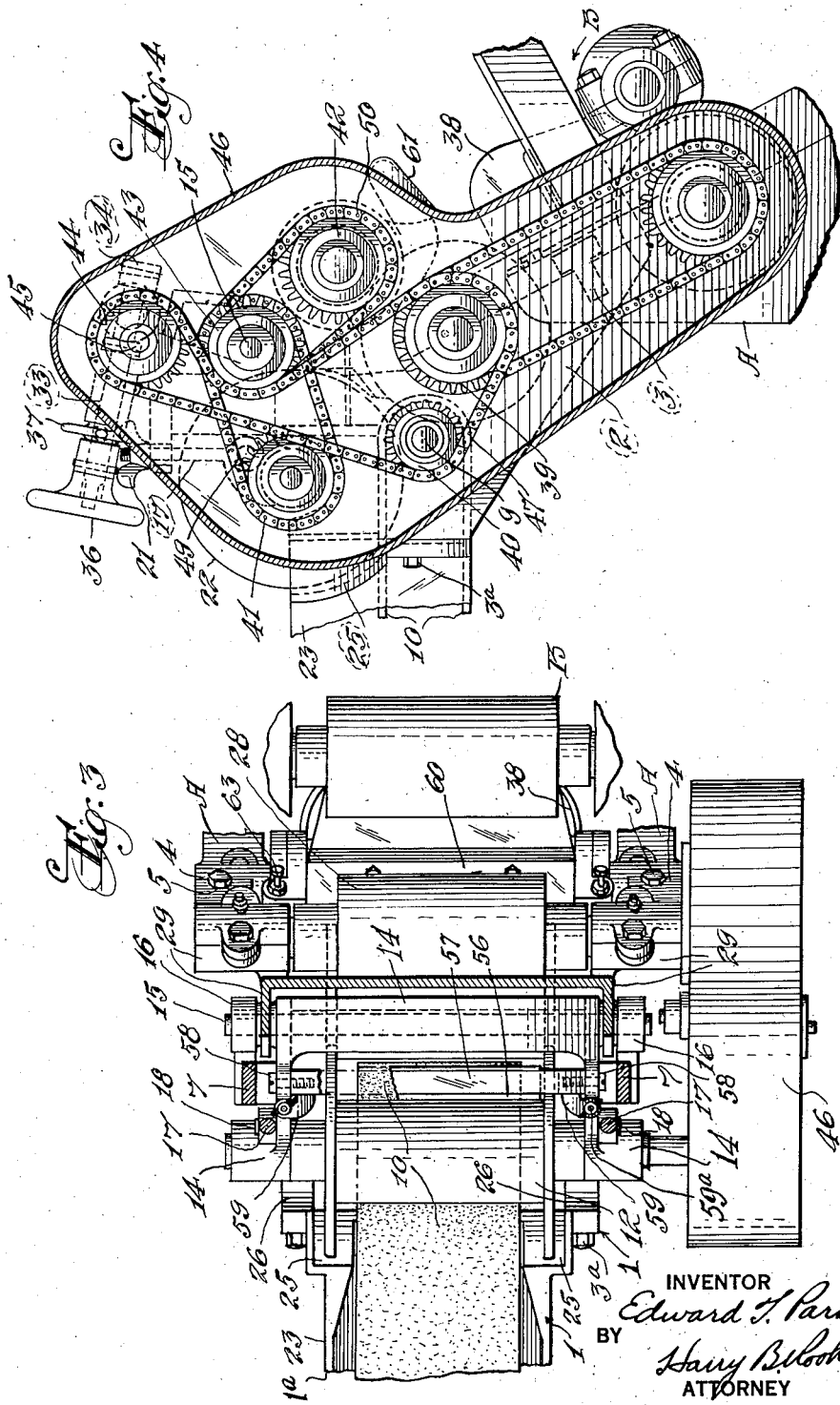

Patented Dec. 8, 1936

2,063,750

UNITED STATES PATENT OFFICE 2,063,750

DOUGH WORKING MACHINE

Edward T. Parsons, Upper Montclair, N. J., assignor to Thomson Machine Company, a corporation of New Jersey Application February 11, 1936, Serial No. 63,297

8 Claims. (Cl. 107—9)

This invention relates in general to dough working machines. It is well known that raw dough contains gases and that it is desirable to have these gases distributed evenly through the dough in small cells of uniform size to provide baked loaves of fine and uniform texture. It is also known that sometimes baked loaves which have been formed with dough working machinery contain large and non-uniformly spaced voids which cause an irregular texture in the dough and result in large holes in the slices when the loaves are sliced for serving.

Therefore, one object of the invention is to provide novel and improved apparatus for feeding lumps of dough to a loaf molding machine and flattening and squeezing the lumps while they are being fed so as to distribute the gases in the dough before the dough is molded into loaves.

Known types of dough molding machines include sheeting rolls for forming lumps of dough into sheets which are then curled and kneaded into loaves. Another object of my invention is to provide in combination with such dough molding machines, simple and compact apparatus of the character described which shall include a belt conveyor for receiving lumps of dough from a source of supply, such as a dough proofer, a roller cooperating with said conveyor to flatten the lumps between them, and dough conditioning rollers to receive the dough between them directly from said conveyor and squeeze the dough before it is fed to said sheeting rolls, so as to distribute the gases in the dough.

Other objects are to provide apparatus of this character which shall include a novel and improved construction, combination and arrangement of a frame, conveyor belt, flattening roller and dough conditioning rollers; to provide in such apparatus an arrangement of parts whereby surplus flour and fragments of dough on the conveyor shall be discharged clear of the dough conditioning rollers and sheeting rolls; to provide a novel and improved combination of the frame of the belt conveyor and means for mounting said dough flattening roller, whereby the lumps of dough shall be confined to the conveyor and yet the flattening roller can be readily adjusted relative to the conveyor; and to obtain other advantages and results as will be brought out by the following description.

Referring to the accompanying drawings in which corresponding and like parts are designated throughout the several views by the same reference characters Figure 1 is a front elevation of a dough feeding and conditioning apparatus embodying my invention with the gear casing shown in section.

Figure 2 is a vertical longitudinal sectional view on the line 2—2 of Figure 1.

Figure 3 is a horizontal sectional view on the line 3—3 of Figure 2 with the gear casing shown in top plan view and Figure 4 is a side elevation of the apparatus showing the gear casing in section.

Figure 1:
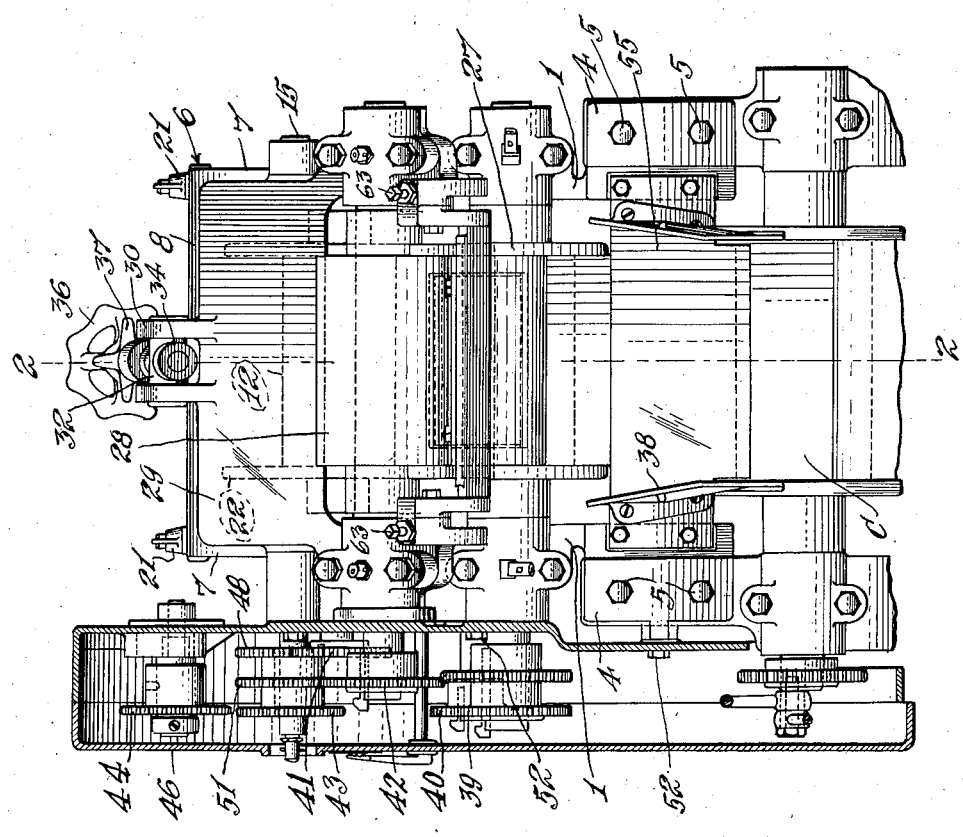

Specifically describing the illustrated embodiment of the invention, the reference character A designates the frame of a loaf molding machine of known construction which has at its upper ends a pair of sheeting rolls B and C which are driven in the direction indicated by the arrows by any suitable driving mechanism and are adapted to receive between them a piece of dough from which a loaf is to be formed.

The apparatus embodying my invention comprises a main frame which includes side pieces 1 which have at one end depending legs 2 that are connected by a cross bar 3. The legs 2 also have alterably extending lugs 4 which are connected to the frame A of the loaf molding machine by cap screws 5 so as to mount the frame on the loaf molding machine above the sheeting rolls B and C. Projecting upwardly from the side pieces 1 is an inverted U-shaped superstructure 6 which includes substantially vertical arms 7 and a cross head 8. Preferably this superstructure is cast in one piece with the legs 2.

Mounted on the main frame at one side of the superstructure is a conveyor which includes two rollers 9 and 9a journaled between the side pieces 1, one located adjacent the legs 2 and the other disposed at the opposite end of the side pieces. An endless conveyor belt 10 runs over said rollers, and preferably the roller 9a is adjustable in the frame to vary the tension on the reaches of the belt. Beneath the belt, the frame has a transverse web 11 for supporting the load on the upper reach of the belt. The conveyor belt is for the purpose of receiving lumps of dough from a source of supply, such as a dough proofer, and conveying the lumps to the loaf molding machine.

In accordance with the invention the lumps of dough are flattened and squeezed during their travel from the conveyor to the sheeting rolls of the loaf molding machine. For this purpose a dough flattening roller 12 is disposed above the upper reach of the conveyor belt at the same side of the superstructure as the belt so as to flatten a lump of dough which passes on the belt beneath the roller. The roller is mounted on a shaft 13 which is journaled at one end of a supplemental frame 14, the other end of which is pivotally mounted on a shaft 15 that is in turn supported in bearings 16 on the arms 7 of the superstructure. The roller is supported and adjusted with respect to the conveyor belt by adjusting bolts 17 one of which is pivotally connected at 18 to each side of the supplemental frame 14 and is slidable through an opening 19 in the cross head 8 of the superstructure. Clamping nuts 20 and 21 are threaded on the bolts 17 at the bottom and top of the cross head respectively.

The roller 12 has end flanges 22 to prevent the lumps of dough from being displaced from the conveyor belt, and the side pieces 1 have portions 23 projecting upwardly above the belt and outside the flanges 22 of the roller. These projecting portions 23 have recesses 25 on their inner faces to provide clearance for the flanges 22 of the roller upon adjustment thereof. The connection of the supplemental frame 14 to the shaft 13 of the roller 12 is outside the flanges 23 of the side pieces 1, and the top edges of the side pieces have recesses 26 providing a clearance for the supplemental frame and the ends of the roller.

Between the conveyor and the sheeting rolls B and C are arranged cooperating dough conditioning rolls 27 and 28 the former of which is journaled in the legs 2 of the side pieces 1 closely adjacent to but spaced from the end roller of the conveyor belt so as to receive dough directly from the belt. The other roller 28 is journaled in a yoke 29 which is pivotally mounted intermediate its ends on the same shaft 16 upon which the supplemental frame 14 is mounted so as to be arranged at the opposite side of the superstructure from the roller 12. Oscillation of the yoke 29 about the shaft 15 will move the roller 28 so as to vary the distance between it and the roller 27, and for the purpose of adjusting and holding the yoke in adjusted position, I have shown the end of the yoke opposite the roller with spaced lugs 30 connected by a cross pin 32 transversely through which passes an adjusting screw 33 which has collars 34 at opposite sides of the pin. The adjusting screw has a thread connection with a boss 35 on the cross head 8, and a hand wheel 36 for rotating the screw. A clamping nut 37 is threaded on the screw between the hand wheel and the boss for locking the screw in adjusted positions.

The various rollers may be driven in any suitable manner, but as shown the roller 27 is driven from the roller C by a chain and sprocket connection 38. The ends of the shafts of the rollers 27, 9, 12 and 28 have connected thereto the respective sprockets 39, 40, 41 and 42, and two idler sprockets 43 and 44 are journaled respectively on the shaft 15 and a stud shaft 45 mounted on the gear casing 46. A chain 47 passes around the sprockets 39, 40, 44 and 43 for driving the rollers. The shaft 15 carries a second sprocket 48 which is connected by a chain 49 to the sprocket 41 of the shaft of the roller 12 for driving the latter, while for driving the shaft of the roller 28, a chain 50 passes around the sprocket 42 of the roller 28 and a third sprocket 51 on the shaft 15. The gear casing 46 is connected to one side piece 1 of the frame by cap screws 52.

In operation of the machine so far described, lumps of dough are disposed on the upper reach of the conveyor belt 10 in any suitable manner, for example from a dough proofer, and the belt is preferably driven at such speed that the lumps of dough will be adequately spaced on the conveyor even upon substantial variations in the intervals at which the lumps are disposed on the conveyor, so as to avoid piling of one lump on another or too close relation of two lumps as the lumps pass under the roller 12. The roller 12 is adjusted a desired distance from the conveyor belt and as the lump passes between the conveyor and the roller, it is flattened and squeezed so as to distribute the gases in the dough. The partially flattened lump is then picked up by the conditioning rollers 27 and 28 and further flattened and squeezed to more evenly and uniformly distribute the gases in the dough. From the roller 27, the dough passes over a guide 55 to the sheeting rolls B and C where it is formed into a relatively thin sheet prior to being curled and kneaded into a loaf.

Any surplus of flour or fragments of dough on the upper reach of the conveyor belt will fall by action of gravity through the space between the roller 9 and the conditioning roller 27 so as to avoid the possibility of the excess flour and dough fragments passing to the conditioning rollers and sheeting rolls to hinder operations or impair the quality of the sheet of dough.

Preferably a scraper blade 56 is provided for the roller 12, said blade being mounted on a rocker bar 57 journaled at 58 between the arms of the supplemental frame 14 and having lateral lugs 59 and adjusting screws 59a for rocking the rocker bar to adjust the blade relative to the roller.

Similarly a scraper 60 may be provided for the conditioning roller 28, said scraper being mounted on a rocker bar 61 journaled at 62 on the yoke 29 and being adjustable by set screws 63.

It will be observed that my invention provides a simple and compact construction, combination and arrangement of the parts so that the apparatus shall be small and occupy a minimum of space, and shall be easy to mount upon the loaf molding machine. The superstructure 6 provides an effectual common support for the supplemental frame 14 and yoke 29 and enables the compact and convenient relationship of the flattening roller 12 and conditioning rollers 27 and 28 and conveyor belt. The roller 12 and conditioning rollers 27 and 28 effectually flatten, squeeze and distribute the gases in the dough before the latter is sheeted and formed into a loaf, so that loaves of uniform texture and high quality can be produced.

While I have shown and described the invention as embodying certain details of construction, it should be understood that the details of structure of the apparatus may be modified and changed by those skilled in the art without departing from the spirit or scope of the invention.

Having thus described my invention, what I claim is:

1. The combination with a loaf moulding machine having a frame and sheeting rolls, of a feeding and dough conditioning apparatus comprising a main frame mounted on the frame of the dough molding machine, a belt conveyor mounted on said frame with one end above said sheeting rolls, a roller above and cooperating with said conveyor to flatten a lump of dough between them, a supplemental frame pivotally mounted at one end on said main frame and carrying said roller, means for adjusting said supplemental frame to vary the distance between said roller and said conveyor, a dough conditioning roller journaled on said main frame between said conveyor and said sheeting rolls of the molding machine to receive dough directly from said conveyor, a yoke pivotally mounted on said main frame on the same axis as said supplemental frame and at the opposite side of said axis, a second dough conditioning roller mounted in said yoke to cooperate with the first conditioning roller to receive the flattened lump between them, and means for adjusting said yoke to vary the distance between said dough conditioning rollers to squeeze the flattened lump between the rollers and distribute the gases in the lump.

2. The combination with a loaf molding machine having a frame and sheeting rolls, of a dough feeding and conditioning apparatus comprising a main frame having side pieces connected at one end to the frame of said loaf molding machine, a conveyor for lumps of dough on said main frame including a pair of rollers journaled between said side pieces and an endless belt running thereover, the side pieces of said frame having an inverted U-shaped superstructure extending upwardly therefrom and bridging said conveyor, a roller at one side of said superstructure overlying said belt to flatten a lump of dough between them, a supplemental frame pivotally mounted on a horizontal axis on the arms of said superstructure above said belt and supporting said roller, means for adjusting said supplemental frame to vary the distance between said roller and said belt, a dough conditioning roller on said main frame between one end of said conveyor and said sheeting rolls of the molding machine to receive dough directly from said conveyor, a yoke pivotally mounted on the arms of said superstructure at the side thereof opposite said supplemental frame and above said sheeting rolls, a second dough conditioning roller mounted on said yoke to cooperate with the first dough conditioning roller, and means for adjusting said yoke to vary the distance between said conditioning rollers.

3. The combination with a loaf molding machine having a frame and sheeting rolls, of a dough feeding and conditioning apparatus comprising a main frame having side pieces connected at one end to the frame of said loaf molding machine, a conveyor for lumps of dough on said main frame including a pair of rollers journaled between said side pieces and an endless belt running thereover, the side pieces of said frame having a superstructure thereon above said belt, a roller above and cooperating with said belt to flatten a lump of dough between them and feed the dough to said sheeting rolls, a supplemental frame having said roller journaled at one end thereof and being pivotally connected at its other end upon said superstructure, and an adjusting bolt connected at one end to said supplemental frame between said roller and said pivotal connection of said supplemental frame to said superstructure for varying the distance between said roller and said belt, a dough conditioning roller on said main frame between one end of said conveyor and said sheeting rolls of the molding machine to receive dough directly from said conveyor, a yoke pivotally mounted on the arms of said superstructure at the side thereof opposite said supplemental frame and above said sheeting rolls, a second dough conditioning roller mounted on said yoke to cooperate with the first dough conditioning roller, and means for adjusting said yoke to vary the distance between said conditioning rollers.

4. The combination with a loaf molding machine having a frame and sheeting rolls, of a dough feeding and conditioning apparatus including a main frame having side pieces with depending leg portions at one end separably mounted on said frame of the loaf molding machine, a conveyor for lumps of dough including a pair of rollers journaled between said side pieces, one roller located adjacent said legs and above said frame of the loaf molding machine, a belt running over said rollers, a roller above and cooperating with said belt to flatten a lump of dough therebetween, means for adjustably mounting said roller on said main frame to vary the distance between the roller and said belt, a dough conditioning roller journaled in said leg portions adjacent the first roller of the conveyor to receive dough directly from the conveyor and feed it to said sheeting rolls, a second dough conditioning roller cooperating with the first conditioning roller to squeeze the dough between them and distribute the gases in the dough, and means adjustably mounting said second dough conditioning roller on said main frame to vary the distance between said conditioning rollers.

5. The combination set forth in claim 4 wherein the first dough conditioning roller is closely adjacent to but spaced from the first-mentioned roller of the conveyor to permit surplus flour from the conveyor belt to be discharged from the conveyor through the space between said first conditioning roller and the conveyor.

6. A dough feeding and conditioning apparatus including a main frame having side pieces to be separably mounted at one end on a loaf molding machine, a conveyor for lumps of dough including a pair of rollers journaled between said side pieces, one roller located adjacent said end, a belt running over said rollers, a roller above and cooperating with said belt to flatten a lump of dough therebetween, means for adjustably mounting said roller on said main frame to vary the distance between the roller and said belt, said roller having end flanges and said side pieces projecting upwardly above said belt outside said end flanges and having recesses in their inner surfaces forming clearance for said flanges upon adjustment of said roller.

7. A dough feeding and conditioning apparatus including a main frame having side pieces to be separably mounted at one end on a loaf molding machine, a conveyor for lumps of dough including a pair of rollers journaled between said side pieces, one roller located adjacent said end, a belt running over said rollers, a roller above and cooperating with said belt to flatten a lump of dough therebetween, means for adjustably mounting said roller on said main frame to vary the distance between the roller and said belt, said roller having end flanges and said side pieces projecting upwardly above said belt outside said end flanges, said adjustable mounting means being connected to the ends of said roller outside said side pieces, and said side pieces of the main frame having recesses forming a clearance for said flanges on the roller and said mounting means.

8. A dough feeding and conditioning apparatus including a main frame having side pieces with depending leg portions at one end to be separably mounted on a loaf molding machine, a conveyor for lumps of dough including a pair of rollers journaled between said side pieces, one roller located adjacent said legs, a belt running over said rollers, a roller above and cooperating with said belt to flatten a lump of dough therebetween, means for adjustably mounting said roller on said main frame to vary the distance between the roller and said belt, a dough conditioning roller journaled in said leg portions adjacent the first roller of the conveyor to receive dough directly from the conveyor, a second dough conditioning roller cooperating with the first conditioning roller to squeeze the dough between them and distribute the gases in the dough, and means adjustably mounting said second dough conditioning roller on said main frame to vary the distance between said conditioning rollers.

EDWARD T. PARSONS.